US012515458B2

(12) United States Patent
Okuwa et al.

(10) Patent No.: US 12,515,458 B2
(45) Date of Patent: Jan. 6, 2026

(54) PRINTING APPARATUS, CONTROL METHOD THEREOF, AND STORAGE MEDIUM STORING PROGRAM

(71) Applicant: BROTHER KOGYO KABUSHIKI KAISHA, Nagoya (JP)

(72) Inventors: Hiroya Okuwa, Kariya (JP); Tatsuya Miyasaka, Nagoya (JP); Shuhei Suzuki, Nagoya (JP); Taiki Tanaka, Yokkaichi (JP); Kazunari Matsuura, Komaki (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 139 days.

(21) Appl. No.: 18/591,400

(22) Filed: Feb. 29, 2024

(65) Prior Publication Data

US 2024/0326462 A1 Oct. 3, 2024

(30) Foreign Application Priority Data

Mar. 31, 2023 (JP) ................................ 2023-057518

(51) Int. Cl.

| | |
|---|---|
| ***B41M 5/035*** | (2006.01) |
| ***B41J 2/045*** | (2006.01) |
| ***B41J 2/21*** | (2006.01) |
| ***B41J 13/03*** | (2006.01) |
| ***B41M 5/025*** | (2006.01) |

(52) U.S. Cl.

CPC ......... *B41J 2/2135* (2013.01); *B41J 2/04505* (2013.01); *B41J 2/04581* (2013.01); *B41J 13/03* (2013.01); *B41M 5/0256* (2013.01); *B41M 5/035* (2013.01)

(58) Field of Classification Search

CPC .... B41M 5/025; B41M 5/0256; B41M 5/035; B41M 5/0358; B41J 2/52; B41J 2/525; B41J 3/546

See application file for complete search history.

(56) References Cited

U.S. PATENT DOCUMENTS

2002/0195005 A1* 12/2002 Oshima ................ B41M 5/0256 101/33
2018/0115656 A1* 4/2018 Noda ................ G06K 15/1806
2022/0127479 A1* 4/2022 Imai ..................... B41M 5/0023

FOREIGN PATENT DOCUMENTS

JP 2017-218680 A 12/2017

* cited by examiner

*Primary Examiner* — Scott A Richmond

(74) *Attorney, Agent, or Firm* — Scully, Scott, Murphy & Presser, P.C.

(57) ABSTRACT

A printing apparatus includes a head and a controller. The head includes a first nozzle and a second nozzle. The first nozzle is configured to eject sublimation ink. The second nozzle is configured to eject non-sublimation ink. The controller is configured to perform a first printing operation of printing an image on a transfer sheet based on image data by ejecting the sublimation ink from the first nozzle. The controller is configured to perform a second printing operation of printing an alignment mark on the transfer sheet by ejecting the non-sublimation ink from the second nozzle.

19 Claims, 12 Drawing Sheets

PRINTING APPARATUS, CONTROL METHOD THEREOF, AND STORAGE MEDIUM STORING PROGRAM

REFERENCE TO RELATED APPLICATIONS

This application claims priority from Japanese Patent Application No. 2023-057518 filed on Mar. 31, 2023. The entire content of the priority application is incorporated herein by reference.

BACKGROUND ART

As a printing method using a printing apparatus, for example, a sublimation transfer dyeing method is known.

SUMMARY

In a sublimation transfer dyeing method, an ink containing a sublimation dye is ejected from an inkjet printer onto a marking sheet surface to create an original image marking sheet. A T-shirt held by a positioning sheet is put on the original image marking sheet. Then, in a state where the original image marking sheet and the T-shirt are overlaid on each other, the original image marking sheet and the T-shirt are heated and pressed by plates of a press machine, whereby the sublimation dye of the original image marking sheet is transferred to the T-shirt.

According to the above-described sublimation transfer dyeing method, an alignment mark is provided on the positioning sheet, and the T-shirt held on the positioning sheet is overlaid on the original image of the original image marking sheet using the alignment mark as a guide. However, there is a possibility that the image quality of the original image transferred to the T-shirt may be deteriorated depending on the method of providing a mark.

In view of the foregoing, an example of an object of this disclosure is to provide a printing apparatus configured for easily aligning an image for transfer and a transfer target medium and suppressing deterioration in image quality of an image transferred to the transfer target medium, a control method thereof, and a storage medium storing a program.

According to one aspect, this specification discloses a printing apparatus. The printing apparatus includes a head and a controller. The head includes a first nozzle and a second nozzle. The first nozzle is configured to eject sublimation ink. The second nozzle is configured to eject non-sublimation ink. The controller is configured to perform a first printing operation of printing an image on a transfer sheet based on image data by ejecting the sublimation ink from the first nozzle. Thus, the printing apparatus prints the image on the transfer sheet with the sublimation ink. The controller is configured to perform a second printing operation of printing an alignment mark on the transfer sheet by ejecting the non-sublimation ink from the second nozzle. Thus, the printing apparatus prints the alignment mark on the transfer sheet with the non-sublimation ink.

According to another aspect, this specification also discloses a control method of controlling the printing apparatus described above. The control method includes: a first printing operation of printing an image on a transfer sheet based on image data by ejecting the sublimation ink from the first nozzle; and a second printing operation of printing an alignment mark on the transfer sheet by ejecting the non-sublimation ink from the second nozzle.

According to still another aspect, this specification also discloses a non-transitory computer-readable storage medium storing a set of program instructions for the printing apparatus described above. The set of program instructions, when executed by the controller, causing the printing apparatus to perform: a first printing operation of printing an image on a transfer sheet based on image data by ejecting the sublimation ink from the first nozzle; and a second printing operation of printing an alignment mark on the transfer sheet by ejecting the non-sublimation ink from the second nozzle.

According to the present disclosure, the image for transfer and the transfer target medium are easily aligned, and deterioration in image quality of an image transferred to the transfer target medium is suppressed.

DESCRIPTION

Figure 1:
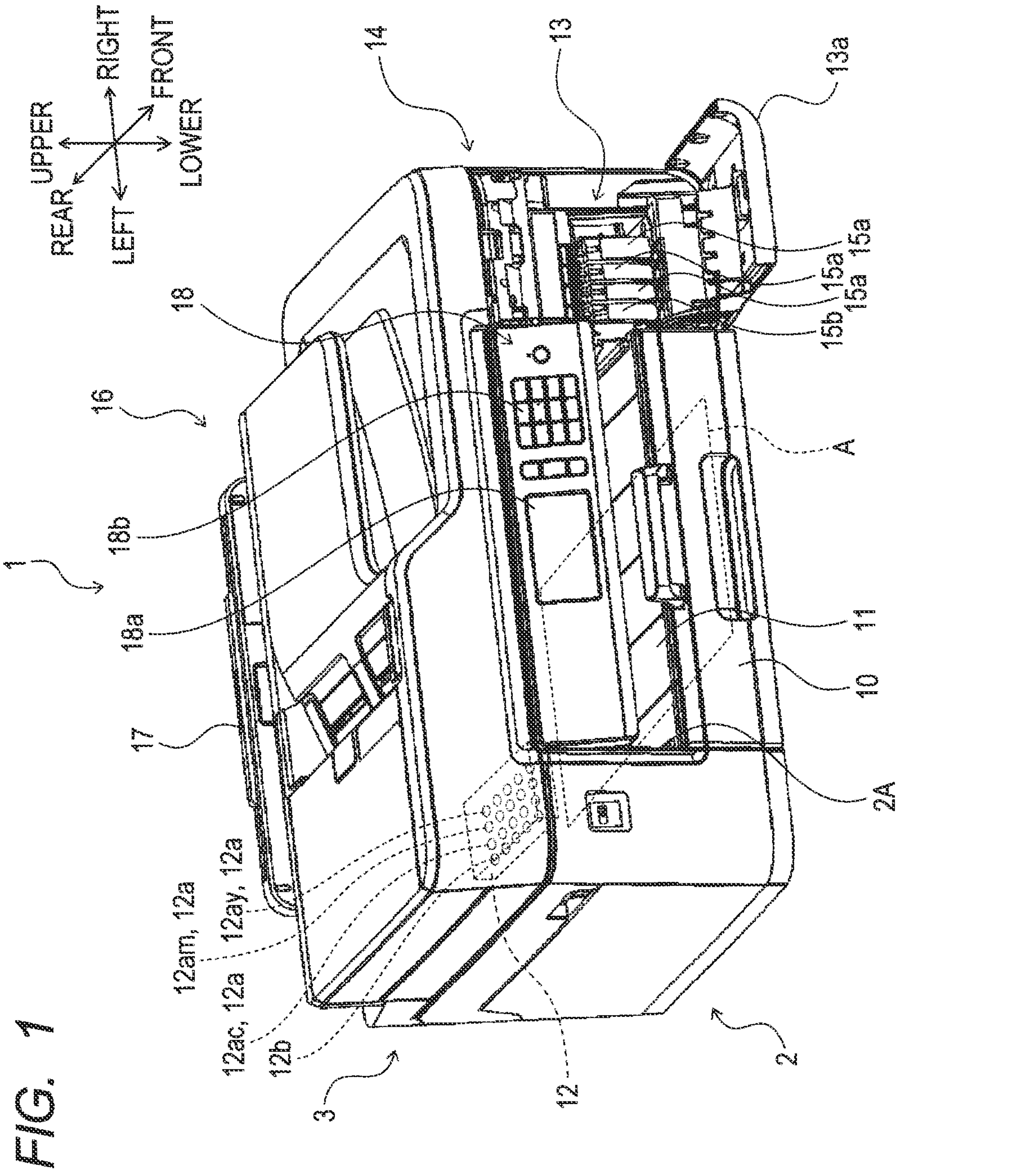
FIG. 1 is an external view showing a configuration of a printing apparatus.

Hereinafter, embodiments according to the present disclosure will be described in detail with reference to the drawings. In the following description, the same or corresponding elements are denoted by the same reference numerals throughout the drawings, and redundant description thereof will be omitted. The present disclosure is not limited to the following embodiments, and additions, deletions, and modifications may be made without departing from the spirit of the present disclosure.

<Overall Configuration of Printing Apparatus>

FIG. 1 is an external view showing a configuration of a printing apparatus 1 according to an embodiment. In this case, a front-rear direction, a left-right direction, and an upper-lower direction are defined as shown in FIG. 1, in a state in which the printing apparatus 1 is installed in a usable state. The printing apparatus 1 has a printer function and a scanner function, and includes a lower housing 2, an upper housing 3, and so on.

The lower housing 2 has a substantially rectangular parallelepiped shape and has an opening 2A at the front. A feed tray 10, a discharge tray 11, a head 12, a cartridge mount portion 13, and a scanner unit 14 are provided within the lower housing 2. The feed tray 10 is formed in a flat tray shape, and is configured to contain a plurality of transfer sheets A having a particular size. The feed tray 10 is accommodated in a lower portion of the lower housing 2 so as to be attachable from and detachable toward the front. The discharge tray 11 is formed in a flat plate shape, is disposed above the feed tray 10, and extends rearward from below the opening 2A. The printing apparatus 1 feeds a transfer sheet A from the feed tray 10 to a position below the head 12 and discharges the transfer sheet A to the discharge tray 11.

The head 12 includes a plurality of first nozzles 12*a* that eject sublimation ink. The first nozzles 12*a* includes cyan nozzles 12*ac* for ejecting sublimation ink of cyan color, magenta nozzles 12*am* for ejecting sublimation ink of magenta color, and yellow nozzles 12*ay* for ejecting sublimation ink of yellow color. The plurality of cyan nozzles 12*ac* are arranged along the front-rear direction to form a cyan nozzle array, the plurality of magenta nozzles 12*am* are arranged along the front-rear direction to form a magenta nozzle array, and the plurality of yellow nozzles 12*ay* are arranged along the front-rear direction to form a yellow nozzle array. By ejecting sublimation ink from at least one first nozzle 12*a* of the cyan nozzles 12*ac*, the magenta nozzles 12*am*, and the yellow nozzles 12*ay*, a reversed image B (FIG. 4B) which is an image for transfer is printed on the transfer sheet A.

The head 12 further includes second nozzles 12*b* which ejects non-sublimation ink which is not sublimation ink. The second nozzles 12*b* include black nozzles for ejecting non-sublimation ink of black color. The plurality of black nozzles are arranged in the front-rear direction to form a black nozzle array. Thus, by ejecting the black non-sublimation ink from the black nozzles which are the second nozzles 12*b*, an alignment mark D (FIG. 4C) is printed on the transfer sheet A.

A cover 13*a* configured to open and close is provided on a lateral side of the front of the lower housing 2, and a cartridge mount portion 13 is provided at a space exposed when the cover 13*a* is opened. The cartridge mount portion 13 has a space configured to accommodate a plurality of (for example, three) first cartridges 15*a* storing sublimation ink and a second cartridge 15*b* storing non-sublimation ink, and the first cartridges 15*a* and the second cartridge 15*b* are attachable to and detachable from the space.

When the first cartridges 15*a* are attached to the cartridge mount portion 13, sublimation ink in the first cartridges 15*a* is sent to the first nozzles 12*a* of the head 12 via supply tubes. When the second cartridge 15*b* is attached to the cartridge mount portion 13, non-sublimation ink in the second cartridge 15*b* is sent to the second nozzles 12*b* of the head 12 via a supply tube. The head 12 is a serial head, and ejects sublimation ink from the first nozzles 12*a* and non-sublimation ink from the second nozzles 12*b* while reciprocating in the left-right direction. In FIG. 1, the serial type head is exemplified, but this disclosure is not limited thereto, and a so-called line type head may be employed as the head 12 of the printing apparatus 1.

The scanner unit 14 is provided at an upper portion of the lower housing 2. The scanner unit 14 is, for example, a flatbed type, and includes a glass document table forming a top surface of the lower housing 2, an image sensor, and an optical system. The scanner unit 14 scans a sheet such as a paper sheet and the transfer sheet A placed on the document table and reads an image on the sheet.

The upper housing 3 is a substantially rectangular parallelepiped housing having substantially the same size in the front-rear and left-right directions as the upper surface of the lower housing 2. The upper housing 3 is provided so as to cover the upper surface of the lower housing 2. The lower housing 2 and the upper housing 3 are connected at their rear ends, and are configured to be opened by rotating the front portion of the upper housing 3 so as to separate the same upward from the front portion of the lower housing 2.

The upper housing 3 is provided with an automatic document feeder (ADF) 16. When one or more sheets are set on the ADF 16, one of the sheets is conveyed onto the document table of the scanner unit 14.

The printing apparatus 1 further includes a rear feed tray 17 at the rear of the lower housing 2 and the upper housing 3. Thus, the printing apparatus 1 also feeds the transfer sheet A from the rear feed tray 17 to below the head 12, instead of the feed tray 10, and prints an image by ejecting sublimation ink from the first nozzles 12*a* of the head 12 onto the transfer sheet A, or prints the alignment mark D by ejecting non-sublimation ink from the second nozzles 12*b* onto the transfer sheet A.

An operation panel 18 is provided at the front of the lower housing 2. The operation panel 18 is an input interface for inputting various information or instructions by a user, and is also an output interface for outputting various information to the user. Thus, the operation panel 18 includes a touch panel type display 18*a*, physical buttons 18*b* such as a numeric keypad, and so on.

Figure 2:
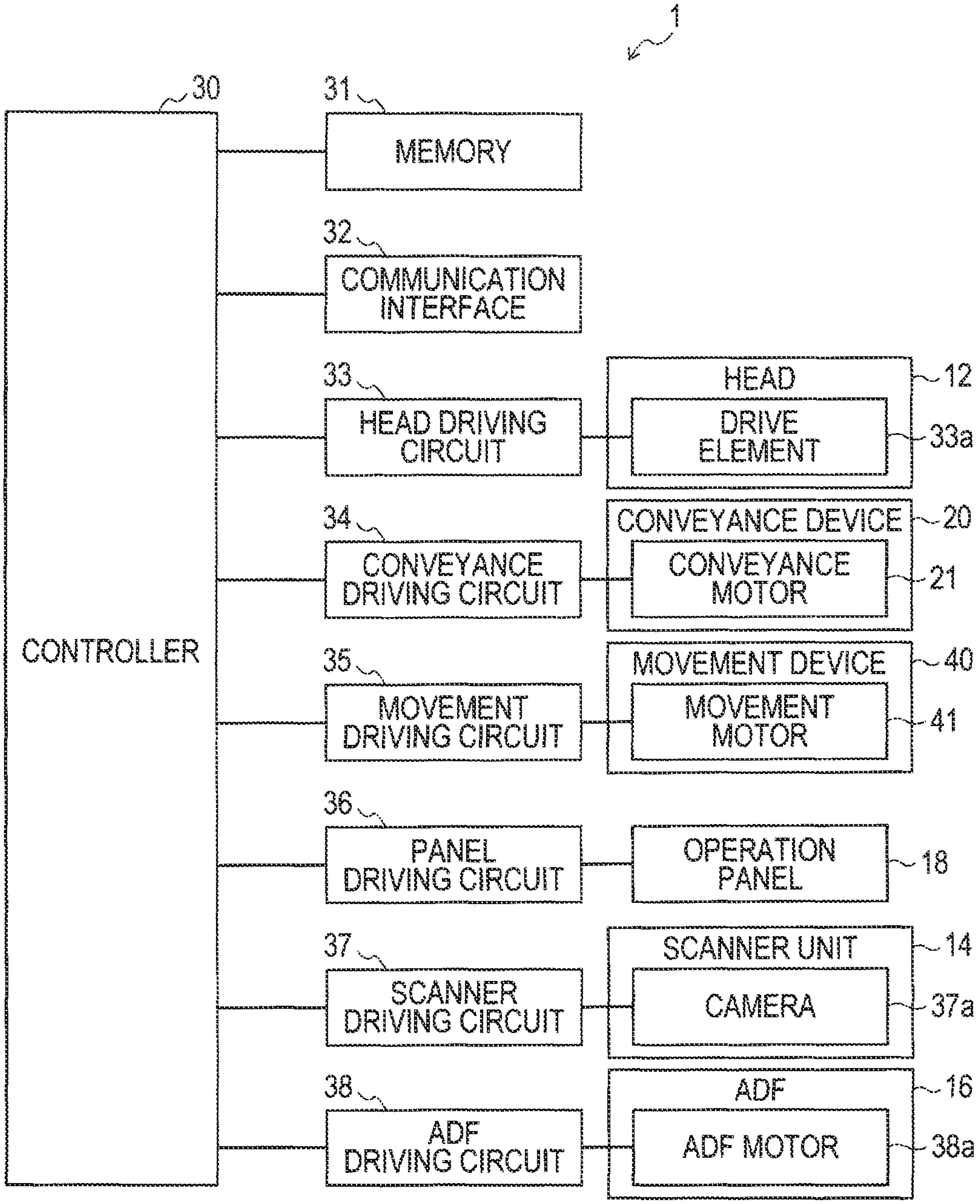
FIG. 2 is a block diagram showing a configuration of the printing apparatus.

FIG. 2 is a block diagram showing the configuration of the printing apparatus 1. As shown in FIG. 2, the printing apparatus 1 also includes a conveyance device (conveyor) 20, a movement device 40, and so on. As shown in FIG. 1, the conveyance device 20 conveys the transfer sheet A from the feed tray 10 or the rear feed tray 17 to the discharge tray 11 through a position below the head 12 in the lower housing 2. Here, the conveyance device 20 conveys the transfer sheet A forward below the head 12 such that a front surface or a back face of the transfer sheet A faces an ejection surface which is the lower surface of the head 12 in which the first nozzles 12*a* and the second nozzles 12*b* are opened. The movement device 40 moves (reciprocates) the head 12 in the left-right direction.

As shown in FIG. 2, the printing apparatus 1 includes a controller 30, as well as a memory 31, a communication interface 32, a head driving circuit 33, a conveyance driving circuit 34, a movement driving circuit 35, a panel driving circuit 36, a scanner driving circuit 37, and an ADF driving circuit 38 which are connected to the controller 30. The controller 30 may be configured by a single device, or a plurality of devices may be configured to distributedly perform operations of the controller 30 in cooperation with each other.

The controller 30 is, for example, a computer, and includes a processor such as an MPU or a circuit such as an ASIC. The memory 31 is a memory accessible from the controller 30, and includes, for example, a RAM and a ROM. The memory 31 stores image data relating to an image to be printed, image data relating to an image acquired by the scanner unit 14, various kinds of data at the time of calculation by the controller 30, and a computer program and data for performing various kinds of data processing. The image data is data representing an image, and is, for example, raster data including pixels which are a plurality of regions obtained by dividing the image. The controller 30 executes a computer program while referring to data stored in the memory 31, thereby controlling operations of each part of the printing apparatus 1.

The communication interface 32 is a connection device that connects the controller 30 to an external device of the printing apparatus 1. Examples of the external device include another computer, a communication network, a storage medium, a display, and another printing apparatus 1. The printing apparatus 1 acquires various kinds of data such as image data from an external device such as a computer via the communication interface 32 and stores the data in the memory 31.

The head driving circuit 33 is electrically connected to drive elements 33*a* such as piezoelectric actuators included in the head 12. The controller 30 generates control signals for controlling driving of the drive elements 33*a* based on image data, and the head driving circuit 33 generates driving signals based on the input control signals. As a result, the drive elements 33*a* are driven based on the driving signals and operate to apply particular ejection pressures to the ink in the head 12 at particular timings. Thus, the controller 30 controls the ejection timing and the size of an ink droplet (volume of the ink droplet) of sublimation ink ejected from each first nozzle 12*a* and non-sublimation ink ejected from each second nozzle 12*b*.

The conveyance driving circuit 34 is electrically connected to a conveyance motor 21 included in the conveyance device 20. The controller 30 generates a control signal for controlling driving of the conveyance motor 21 based on image data, and the conveyance driving circuit 34 generates a driving signal based on the input control signal. As a result, the conveyance motor 21 is driven based on the driving signal, and the conveyance device 20 intermittently or continuously conveys the transfer sheet A from the feed tray 10 or the rear feed tray 17 to the discharge tray 11 through the lower side of the head 12.

The movement driving circuit 35 is electrically connected to a movement motor 41 included in the movement device 40. The controller 30 generates a control signal for controlling driving of the movement motor 41 based on image data, and the movement driving circuit 35 generates a driving signal based on the input control signal. As a result, the movement motor 41 is driven based on the driving signal, and the movement device 40 moves the head 12 in the left-right direction and stops the head 12 at a desired position within the movable range.

The panel driving circuit 36 is electrically connected to the operation panel 18 described above. The controller 30 controls the operation of the display 18*a* of the operation panel 18 via the panel driving circuit 36. Information or an instruction from the physical button 18*b* operated by the user is input to the controller 30.

The scanner driving circuit 37 is electrically connected to a camera 37*a* included in the scanner unit 14 described above. The controller 30 controls the operation of the camera 37*a* via the scanner driving circuit 37. Thereby, the scanner unit 14 captures an image of the sheet placed on the document table with the camera 37*a*, and the acquired image is stored in the memory 31.

The ADF driving circuit 38 is electrically connected to an ADF motor 38*a* included in the ADF 16 described above. The controller 30 controls the operation of the ADF motor 38*a* via the ADF driving circuit 38. Thereby, the ADF 16 rotates an ADF roller connected to the ADF motor 38*a*, and conveys one or more sheets to the document table of the scanner unit 14 one sheet at a time.

<Printing Operation>

Figure 3:
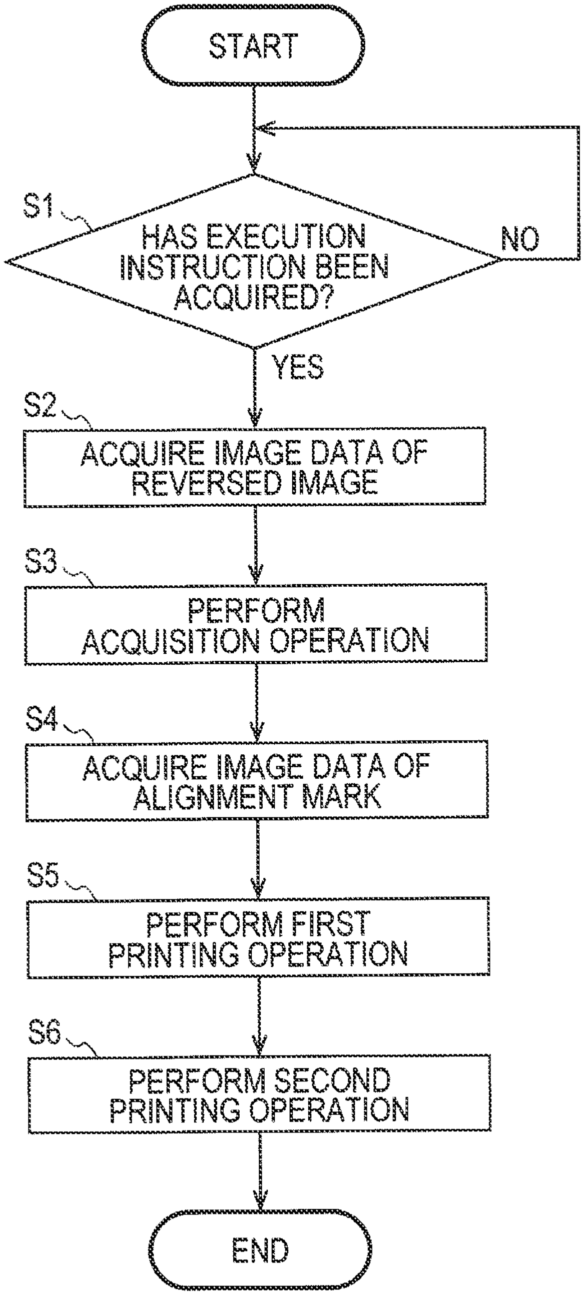
FIG. 3 is a flowchart showing an example of a control method of controlling the printing apparatus.

FIG. 3 is a flowchart showing an example of a printing operation of the printing apparatus 1 according to the embodiment. Here, the controller 30 of the printing apparatus 1 monitors an execution instruction of the printing operation (S1). The execution instruction may be an instruction input from the operation panel 18 or an instruction input from an external device via the communication interface 32.

In response to receiving the execution instruction of the printing operation (S1: YES), the controller 30 acquires image data of the reversed image B (FIG. 4B) from the memory 31 (S2). Specifically, the controller 30 acquires the image data of the reversed image B based on image data of a transfer image C. The reversed image B is an image obtained by reversing the transfer image C that is an image to be transferred to the transfer target medium E such as a fabric shown in FIG. 4A. The image data of the transfer image C may be transmitted from an external device via the communication interface 32 or may be read by the scanner unit 14 included in the printing apparatus 1.

Figure 4A:
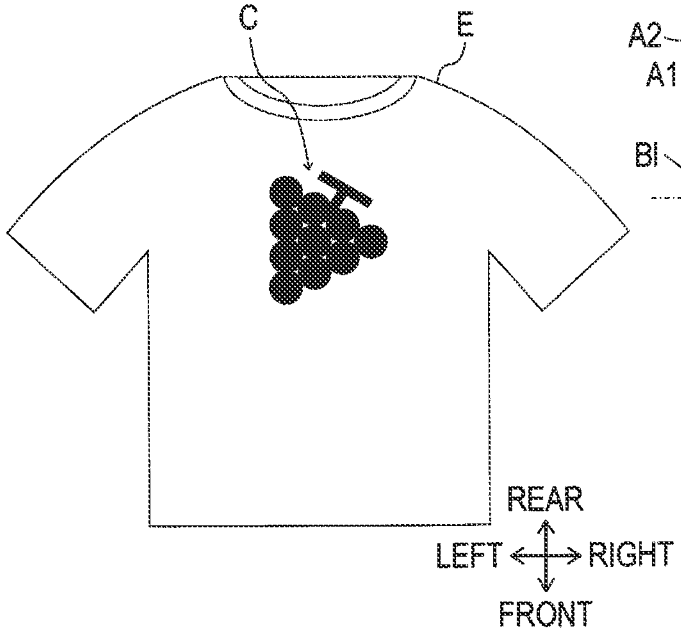
FIG. 4A is a view showing a transfer target medium to which a transfer image is transferred.

The controller 30 performs an acquisition operation of acquiring a position of the alignment mark D (FIG. 4C) based on image data of the reversed image B (S3). Specifically, as shown in FIG. 4C, the alignment mark D is a mark used for aligning (positioning) the reversed image B on the transfer target medium E when the reversed image B printed on the transfer sheet A is transferred to the transfer target medium E (FIG. 4A). For example, when the reversed image B is printed on a front surface A1 of the transfer sheet A, the alignment mark D is printed on a back surface A2 of the transfer sheet A, which is a different surface from the front surface A1, as shown in FIG. 4C. The image data of the reversed image B has pixel values and positions of pixels constituting the reversed image B.

Based on pixel values of image data of the reversed image B, the controller 30 acquires pixels at four ends (for example, a right end Br, a left end Bl, a front end Bf, and a rear end Bb) of the reversed image B in directions crossing each other (for example, perpendicular to each other) among the pixels of the reversed image B. The controller 30 then acquires positions that are line-symmetric to the positions of the four pixels in the front surface A1 of the transfer sheet A with respect to a center line A0 (as the symmetry axis) that passes through the center of the transfer sheet A in the left-right direction and the front-rear direction and extends in the front-rear direction. Then, the controller 30 acquires, as the position of the alignment mark D, the positions obtained by applying the symmetrical positions to the back surface A2 of the transfer sheet A (for example, a left end Br' corresponding to the right end Br, a right end Bl' corresponding to the left end Bl, a front end Bf' corresponding to the front end Bf, and a rear end Bb' corresponding to the rear end Bb). Thus, when viewed in the thickness direction of the transfer sheet A perpendicular to the back surface A2, the right end Br and the left end Br' overlap each other, the left end Bl and the right end Bl' overlap each other, the front end Bf and the front end Bf' overlap each other, and the rear end Bb and the rear end Bb' overlap each other.

The controller 30 acquires image data of the alignment mark D (S4). For example, the alignment mark D is a surrounding line surrounding the image and has a rectangular shape. In this case, the alignment mark D has a pair of line segments Da and a pair of line segments Db. The pair of line segments Da passes through the left end Br' and the right end Bl' acquired in S3 and extending linearly along the front-rear direction between the front end Bf' and the rear end Bb' in the front-rear direction. The pair of line segments Db passes through the front end Bf' and the rear end Bb' acquired in S3 and extending linearly along the left-right direction between the left end Br' and the right end Bl' in the left-right direction. The controller 30 acquires, as image data of the alignment mark D, data indicating the pair of line segments Da extending linearly along the front-rear direction and the pair of line segments Db extending linearly along the left-right direction. The image data of the transfer image C, the reversed image B, and the alignment mark D may be data defined by color values in the RGB color space or data defined by color values in the CMYK color space. The image data may be data converted to a resolution printable by the printing apparatus 1.

When viewed in the thickness direction of the transfer sheet A, the line segments Da and Db of the alignment mark D on the back surface A2 overlap the reversed image B on the front surface A1 at the ends Br, Bl, Bf, and Bb. Thus, the reversed image B is located on the surrounding line and inside the surrounding line so as not to be located outside the surrounding line which is the alignment mark D. However, when viewed in the thickness direction of the transfer sheet A, the reversed image B may be located inside the surrounding line which is the alignment mark D such that the line segments Da and Db of the alignment mark D are in contact with the ends of the reversed image B. Further, when viewed in the thickness direction of the transfer sheet A, the alignment mark D may be located at a particular distance from the reversed image B. For example, in FIG. 4C, the left line segment Da may be shifted to the left from the left end Br' and may be separated from the left end Br' by a particular distance. The right line segment Da may be shifted to the right from the right end Bl' and may be separated from the right end Bl' by a particular distance. The front line segment Db may be shifted forward from the front end Bf' and may be separated from the front end Bf' by a particular distance. The rear line segment Db may be shifted rearward from the rear end Bb' and may be separated from the rear end Bb' by a particular distance.

Figure 4B:
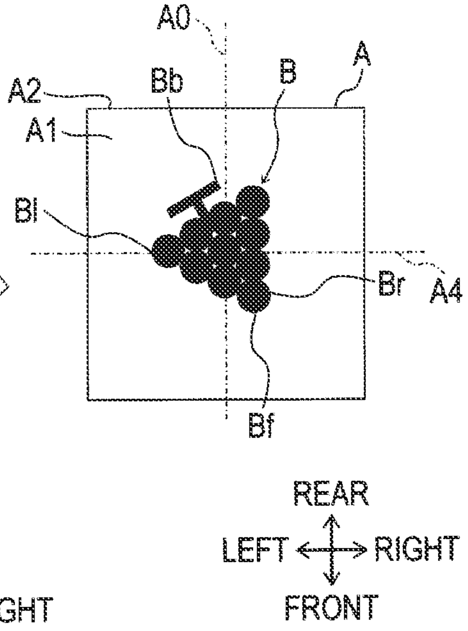
FIG. 4B is a view showing a front surface of a transfer sheet on which a reversed image is printed.
Figure 4C:
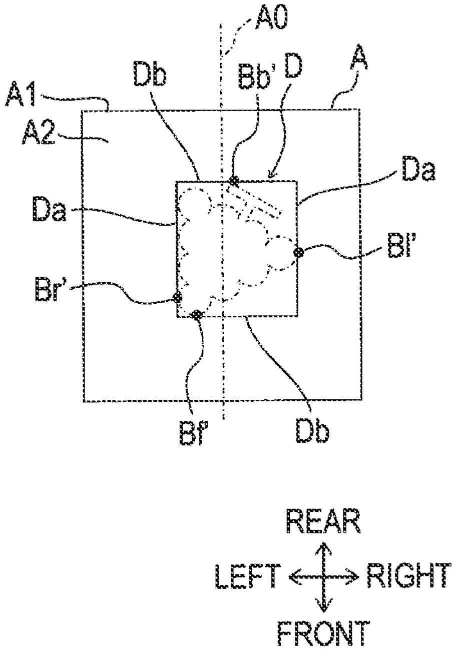
FIG. 4C is a view showing a back surface of the transfer sheet, which is obtained by turning over the transfer sheet of FIG. 4B about a center line A0 and printing an alignment mark.

As shown in FIG. 4B, the controller 30 performs a first printing operation of printing the reversed image B, which is an image for transfer, on the transfer sheet A based on image data by ejecting sublimation ink from the first nozzles 12*a* (S5). Specifically, in the first printing operation, the controller 30 performs a halftone process and so on on image data of the reversed image B to convert the reversed image B into print data that is printable by the printing apparatus 1. In a case where image data is defined by color values in the RGB color space, the controller 30 performs a color conversion process of converting the image data into data defined by color values in the CMYK color space. The controller 30 may also perform a resolution conversion process of converting image data into resolution that is printable by the printing apparatus 1.

Then, the controller 30 controls the conveyance device 20 to convey the transfer sheet A from the feed tray 10 by the conveyance device 20, for example, and causes the front surface A1 of the transfer sheet A to face the ejection surface of the head 12. Based on the print data obtained by converting the image data of the reversed image B, the controller 30 alternately repeats a conveyance control of controlling the conveyance device 20 to convey the transfer sheet A and a pass control of controlling the head 12 to eject sublimation ink from the first nozzles 12*a* opened in the ejection surface of the head 12 while controlling the movement device 40 to move the head 12 in the left-right direction. With this operation, the reversed image B is printed on the front surface A1 of the transfer sheet A with sublimation ink, and the transfer sheet A is discharged to the discharge tray 11.

As shown in FIG. 4C, the controller 30 performs a second printing operation of printing the alignment mark D on the transfer sheet A by ejecting non-sublimation ink from the second nozzles 12*b* (S6). Specifically, in the second printing operation, the controller 30 performs a halftone process and so on on image data of the alignment mark D to convert the image data into print data that is printable by the printing apparatus 1. The user manually reverses the transfer sheet A in the left-right direction about the center line A0. Then, the controller 30 controls the conveyance device 20 to convey the transfer sheet A to a position below the head 12 by the conveyance device 20, and causes the back surface A2 of the transfer sheet A to face the ejection surface of the head 12. Then, based on the print data obtained by converting the image data of the alignment mark D, the controller 30 alternately repeats a conveyance control of controlling the conveyance device 20 to convey the transfer sheet A and a pass control of controlling the head 12 to eject non-sublimation ink from the second nozzles 12*b* opened in the ejection surface of the head 12 while controlling the movement device 40 to move the head 12 in the left-right direction. With this operation, the alignment mark D is printed on the back surface A2 of the transfer sheet A with non-sublimation ink, and the transfer sheet A is discharged to the discharge tray 11.

<Transfer Method>

Figure 5A:
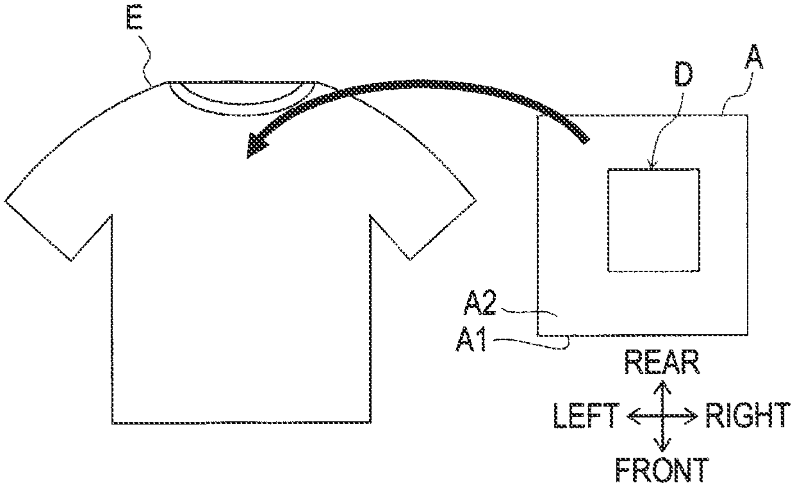
FIG. 5A is a view showing a back surface of a transfer sheet and a transfer target medium.

In this way, as shown in FIG. 4B and FIG. 4C, the transfer sheet A having the front surface A1 on which the reversed image B is printed with sublimation ink and the back surface A2 on which the alignment mark D is printed with non-sublimation ink is formed. Then, as shown in FIG. 5A, in a state where the front surface A1 of the transfer sheet A faces the transfer target medium E, the user places the transfer sheet A on the transfer target medium E by using the alignment mark D on the back surface A2 of the transfer sheet A as a mark, such that the reversed image B (FIG. 4B) of the front surface A1 is arranged at a desired position on the transfer target medium E.

Figure 5B:
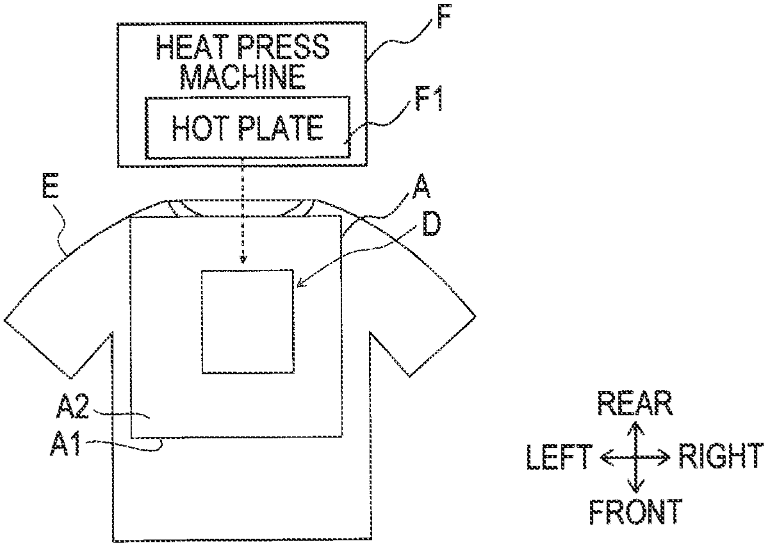
FIG. 5B is a view showing the transfer target medium on which the transfer sheet is overlaid in a state where a front surface of the transfer sheet faces the transfer target medium.
Figure 5C:
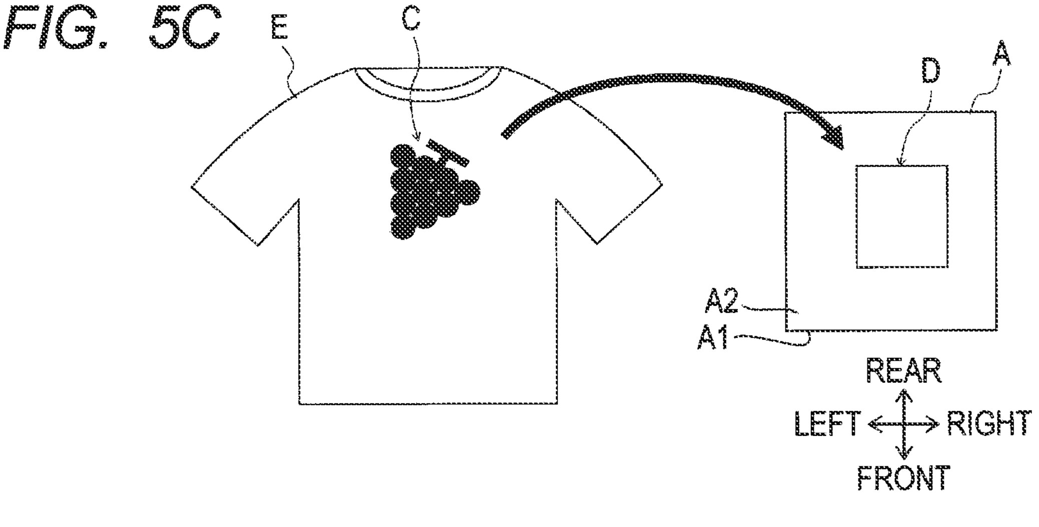
FIG. 5C is a view showing the transfer target medium to which a reversed image has been transferred and the transfer sheet which has been removed from the transfer target medium.

As shown in FIG. 5B, the user heats at least one of a pair of hot plates F1 of a heat press machine F, and then, sandwiches the transfer target medium E on which the transfer sheet A is overlaid between the pair of hot plates F1, and heats and pressurizes the transfer sheet A. As a result, as shown in FIG. 5C, sublimation ink on the front surface A1 of the transfer sheet A is sublimated, and the transfer image C is transferred to the transfer target medium E facing the front surface A1 of the transfer sheet A. Then, the user removes the transfer sheet A from the transfer target medium E.

In contrast, the alignment mark D on the transfer sheet A is formed of non-sublimation ink, and thus, the alignment mark D is not sublimated even when heated and pressurized, and are not transferred to the transfer target medium E or the hot plates F1. This suppresses contamination of the transfer target medium E and the hot plates F1 due to the alignment mark D, and thus suppresses deterioration of the image quality of the transfer image C on the transfer target medium E due to the contamination.

In this way, the reversed image B is printed on the transfer sheet A with sublimation ink, whereas the alignment mark D is printed on the transfer sheet A with non-sublimation ink. Thus, the reversed image B and the transfer target medium E are easily aligned based on the alignment mark D, and the deterioration of the image quality of the transfer image C transferred to the transfer target medium E is suppressed. Further, the alignment mark D is printed on the back surface A2 of the transfer sheet A different from the front surface A1 on which the reversed image B is printed. The reversed image B printed on the front surface A1 is arranged within the alignment mark D printed on the back surface A2, when viewed in the thickness direction of the transfer sheet A. Thus, when the front surface A1 of the transfer sheet A faces the transfer target medium E, the back surface A2 of the transfer sheet A faces the user. This enables the user to easily align the reversed image B and the transfer target medium E such that the reversed image B printed on the front surface A1 of the transfer sheet A is arranged at a desired position on the transfer target medium E, while viewing the alignment mark D printed on the back surface A2.

Figure 4D:
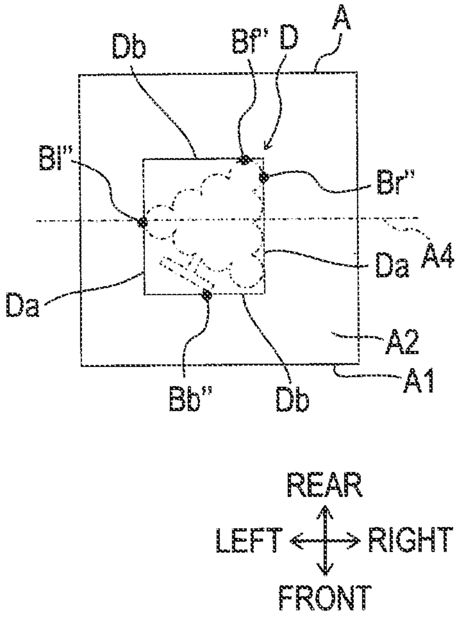
FIG. 4D is a view showing a back surface of the transfer sheet, which is obtained by turning over the transfer sheet of FIG. 4B about a center line A4 and printing an alignment mark.

In the above configuration, in the acquisition operation of S3 in FIG. 3, as shown in FIG. 4B and FIG. 4C, the controller 30 acquires positions that are line-symmetric to the four ends Br, Bl, Bf, and Bb of the reversed image B with respect to the center line A0 as the symmetry axis. Then, the controller 30 acquires the positions Br', Bl', Bf', and Bb' obtained by applying the symmetrical positions to the back surface A2 of the transfer sheet A as the positions of the alignment mark D. Alternatively, as shown in FIG. 4B and FIG. 4D, the controller 30 may acquire positions that are line-symmetric to the four ends Br, Bl, Bf, and Bb of the reversed image B with respect to a center line A4 (as the symmetry axis) that passes through the center of the transfer sheet A and extends in the left-right direction. Then, the controller 30 may acquire positions obtained by applying the symmetrical positions to the back surface A2 of the transfer sheet A (for example, a right end Br" corresponding to the right end Br, a left end Bl" corresponding to the left end Bl, a rear end Bf" corresponding to the front end Bf, and a front end Bb" corresponding to the rear end Bb) as the positions of the alignment mark D.

In this case, in the second printing operation of S6 in FIG. 3, the transfer sheet A is turned over in the front-rear direction about the center line A4 manually or by the conveyance device 20. Then, the back surface A2 of the transfer sheet A faces the ejection surface of the head 12 at a position below the head 12, and the transfer sheet A is conveyed forward by the conveyance device 20. Then, the alignment mark D is printed on the back surface A2 of the transfer sheet A with non-sublimation ink, and the transfer sheet A is discharged to the discharge tray 11. When viewed in the thickness direction of the transfer sheet A, the reversed image B printed on the front surface A1 is arranged within the alignment mark D printed on the back surface A2.

Figure 6A:
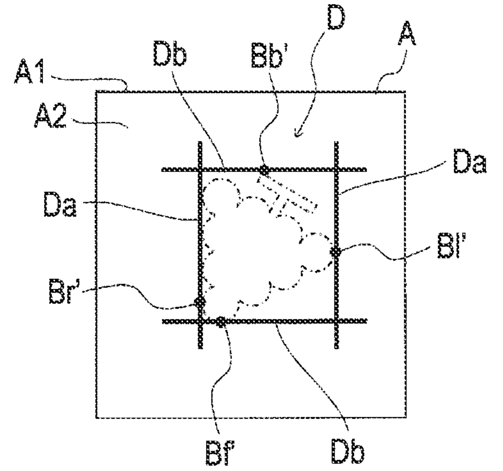
FIGS. 6A, 6B, 6C, 6D, 6E and 6F are views showing back surfaces of transfer sheets on which alignment marks are printed.
Figure 6D:
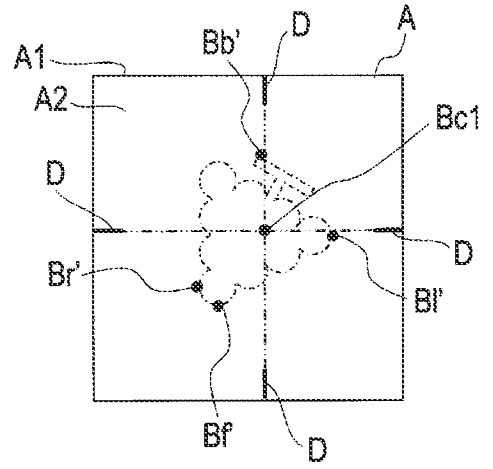
Figure 6B:
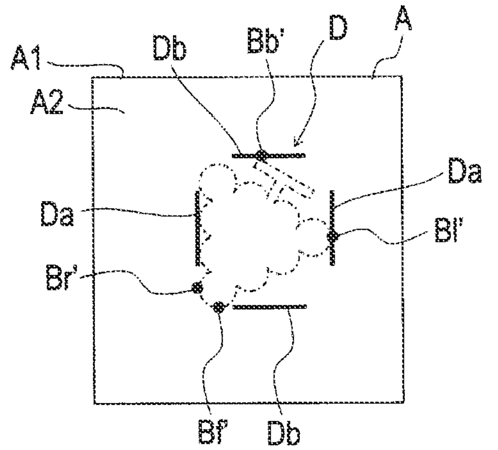

In FIG. 4C, the alignment mark D has a rectangular shape, but the shape of the alignment mark D is not limited to this. For example, as shown in FIG. 6A, the alignment mark D may be provided such that line segments Da extending in the front-rear direction and line segments Db extending in the left-right direction intersect with each other. As shown in FIG. 6B, the alignment mark D may be provided such that line segments Da extending in the front-rear direction and line segments Db extending in the left-right direction are not connected to each other. In this case, each line segment Da is arranged between the pair of line segments Db arranged with an interval therebetween in the front-rear direction, and is shorter than this interval. Each line segment Db is arranged between the pair of line segments Da arranged with an interval therebetween in the left-right direction, and is shorter than this interval.

Figure 6E:
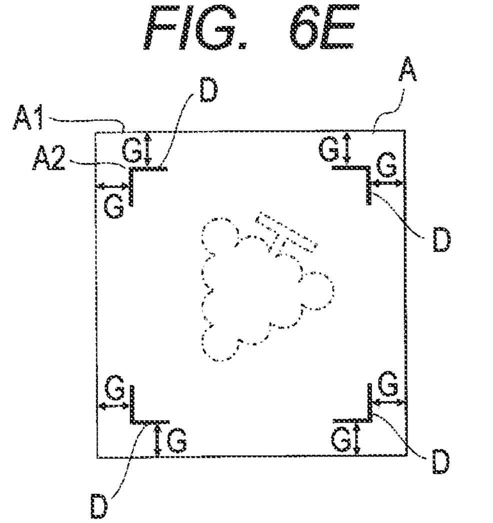
Figure 6C:
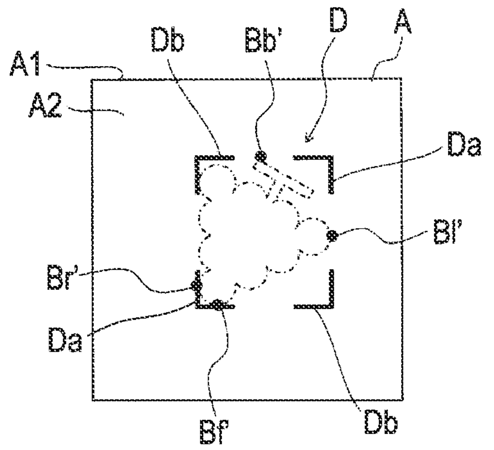
Figure 6F:
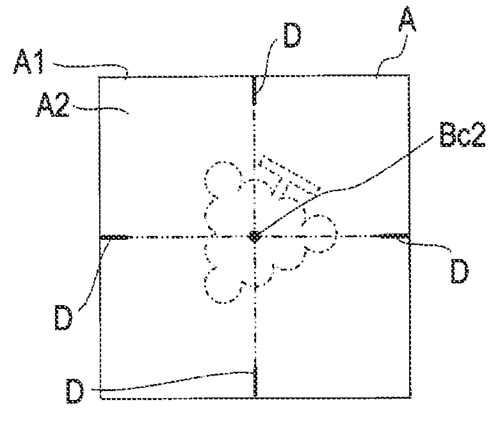

As shown in FIG. 6C, the alignment mark D may be four corners that are parts of the rectangular surrounding line of FIG. 4C. As shown in FIG. 6D, the alignment mark D may be parts of a line segment extending in the front-rear direction and passing through a center Bc1 of the rectangular surrounding line of FIG. 4C, that is, the center Bc1 of the reversed image B, and parts of a line segment extending in the left-right direction and passing through the center Bc1. As shown in FIG. 6E, the alignment mark D may be line segments arranged at a particular distance G from the edges of the transfer sheet A. As shown in FIG. 6F, the alignment mark D may be parts of a line segment passing through a center Bc2 of the transfer sheet A and extending in the front-rear direction and parts of a line segment passing through the center Bc2 and extending in the left-right direction.

In these modifications as well, the reversed image B is printed on the transfer sheet A with sublimation ink, while the alignment mark D is printed on the transfer sheet A with non-sublimation ink. Thus, the reversed image B and the transfer target medium E are easily aligned based on the alignment mark D, and the contamination by the alignment mark D at the time of transfer is reduced, whereby the deterioration of the image quality of the transfer image C due to the alignment mark D is suppressed. Further, the alignment marks D in FIGS. 6A to 6D are arranged based on the position of the reversed image B, and thus the reversed image B and the transfer target medium E are easily aligned based on the alignment mark D.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Thus, the disclosure is intended to embrace all known or later developed alternatives, modifications, variations, improvements, and/or substantial equivalents. Some specific examples of potential alternatives, modifications, or variations in the described invention are provided below.

Figure 7A:
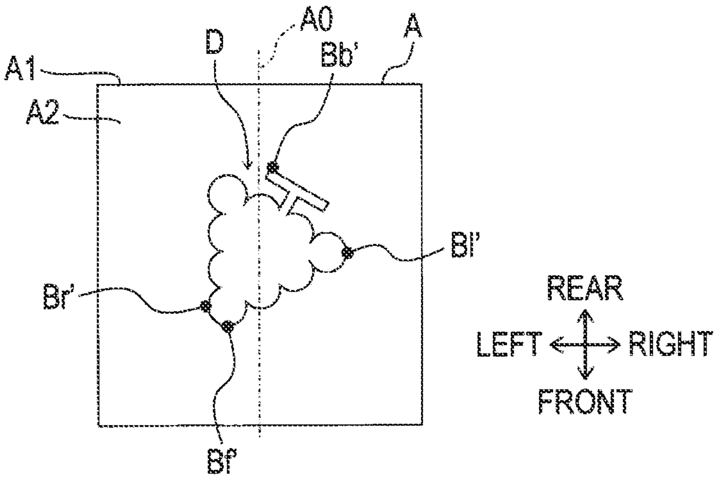
FIG. 7A is a view showing a back surface of a transfer sheet on which an alignment mark is printed.
Figure 7B:
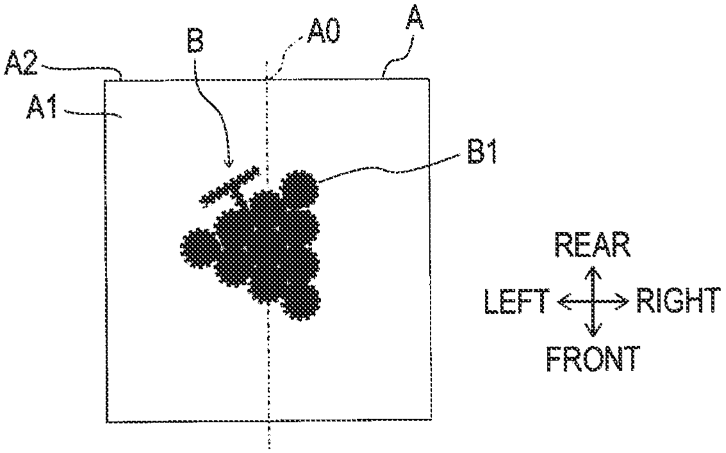
FIG. 7B is a view showing a front surface of the transfer sheet on which a reversed image is printed.
Figure 7C:
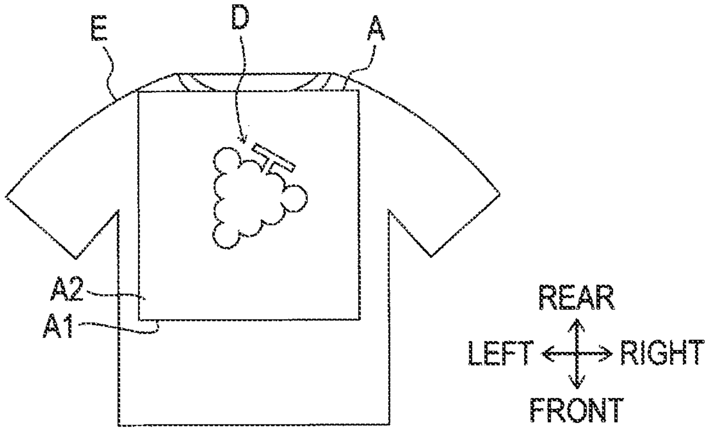
FIG. 7C is a view showing a transfer target medium on which the transfer sheet is overlaid in a state where the front surface of the transfer sheet faces the transfer target medium.

In the printing apparatus 1 according to Modification 1, as shown in FIG. 7A, the alignment mark D is a line drawing representing an outline B1 of the reversed image B shown in FIG. 7B. In S4 in the example of the printing operation shown in the flowchart of FIG. 3, by using known image processing such as edge detection, the controller 30 acquires pixels constituting the outline B1 among pixels constituting the reversed image B based on image data of the reversed image B. The controller 30 then acquires positions that are line-symmetric to the positions of the pixels of the outline B1 with respect to the center line A0 as the symmetry axis. The controller 30 then sets, as the position of the alignment mark D, the positions obtained by applying the symmetrical positions to the back surface A2 of the transfer sheet A, and acquires data relating pixels arranged at the positions as image data of the alignment mark D. Since this alignment mark D is the outline B1 of the reversed image B, the alignment mark D is a line drawing represented by a line forming the periphery of the reversed image B. Since the image data of the alignment mark D acquired in this way includes the position of the alignment mark D, the acquisition operation of S3 is included in the process of S4.

Then, the controller 30 performs the first printing operation based on image data of the reversed image B to print the reversed image B on the front surface A1 of the transfer sheet A with sublimation ink (S5). The transfer sheet A is manually turned over in the left-right direction about the center line A0. Then, the controller 30 performs the second printing operation based on image data of the alignment mark D to print the alignment mark D on the back surface A2 of the transfer sheet A with non-sublimation ink (S6). In this way, the transfer sheet A on which the reversed image B and the alignment mark D are printed is formed. When viewed in the thickness direction of the transfer sheet A, the alignment mark D printed on the back surface A2 overlaps the outline B1 of the reversed image B printed on the front surface A1.

In this case as well, the reversed image B is printed on the transfer sheet A with sublimation ink, while the alignment mark D is printed on the transfer sheet A with non-sublimation ink. Thus, the reversed image B and the transfer target medium E are easily aligned based on the alignment mark D, and the contamination by the alignment mark D at the time of transfer is reduced, whereby the deterioration of the image quality of the transfer image C due to the alignment mark D is suppressed. The alignment mark D is a line drawing representing the outline B1 of the reversed image B, which enables the user to easily imagine the reversed image B based on the alignment mark D, and to easily align the reversed image B at a desired position on the transfer target medium E. Further, since the alignment mark D is printed on the back surface A2 different from the front surface A1 of the transfer sheet A on which the reversed image B is printed, the reversed image B and the transfer target medium E are easily aligned while viewing the alignment mark D printed on the back surface A2 of the transfer sheet A in a state where the front surface A1 of the transfer sheet A on which the reversed image B is printed faces the transfer target medium E.

The amount of non-sublimation ink used to print the alignment mark D may be less than the amount of sublimation ink used to print the outline B1 of the reversed image B. In a case where the outline B1 of the reversed image B is printed with a plurality of sublimation inks, the amount of sublimation ink is the total amount of the plurality of sublimation inks used for printing the outline B1.

For example, the size of ink droplets of non-sublimation ink ejected from the second nozzles 12*b* when the alignment mark D is printed may be smaller than the size of ink droplets of sublimation ink ejected from the first nozzles 12*a* when the outline B1 of the reversed image B is printed, so that the ejection amount of non-sublimation ink used for printing the alignment mark D is smaller than the ejection amount of sublimation ink used for printing the outline B1 of the reversed image B.

The number of times of ejecting ink droplets of non-sublimation ink from the second nozzles 12*b* when printing the alignment mark D may be set to be smaller than the number of times of ejecting ink droplets of sublimation ink from the first nozzles 12*a* when printing the outline B1 of the reversed image B, so that the ejection amount of non-sublimation ink used for printing the alignment mark D is smaller than the ejection amount of sublimation ink used for printing the outline B1 of the reversed image B. In this way, the density of the alignment mark D printed on the transfer sheet A becomes lower than the density of the reversed image B printed on the transfer sheet A. This reduces the amount of non-sublimation ink for printing the alignment mark D.

In S4 of FIG. 3, the controller 30 may acquire, as image data of the alignment mark D, data relating to pixels that are line-symmetric to the pixels of the outline B1 with respect to the center line A4 (FIG. 4D) as the symmetry axis. In this case, in the second printing operation in S6, the transfer sheet A is turned over in the front-rear direction about the center line A4 manually or by the conveyance device 20, and then the alignment mark D is printed on the back surface A2 of the transfer sheet A with non-sublimation ink. When viewed in the thickness direction of the transfer sheet A, the alignment mark D printed on the back surface A2 overlaps the outline B1 of the reversed image B printed on the front surface A1.

Figure 8A:
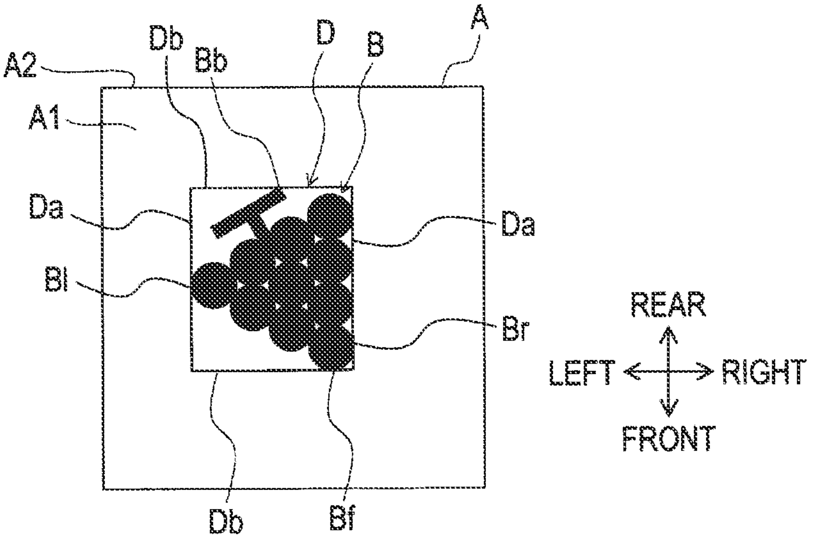
FIG. 8A is a view showing a front surface of a transfer sheet on which a reversed image and an alignment mark are printed.

In the printing apparatus 1 according to Modification 2, as shown in FIG. 8A, the alignment mark D is printed on the same surface as the front surface A1 of the transfer sheet A on which the reversed image B is printed. In the following description, a case where a surrounding line is used as the alignment mark D will be described, but the shape of the alignment mark D is not limited thereto. For example, the alignment mark D may have a shape as shown in FIGS. 6A, 6B, 6C, 6D, 6E and 6F, or may be a line drawing of the reversed image B as shown in FIG. 7A.

In this case, in the acquisition operation in S3 of FIG. 3, the controller 30 acquires the positions of the four ends Br, Bl, Bf, and Bb of the reversed image B as the position of the alignment mark D. Then, in S4, the controller 30 acquires a pair of line segments Da and a pair of line segments Db as image data of the alignment mark D. The pair of line segments Da passes through the right end Br and the left end Bl and extends linearly in the front-rear direction between the front end Bf and the rear end Bb. The pair of line segments Db passes through the front end Bf and the rear end Bb and extends linearly in the left-right direction between the right end Br and the left end B1.

Then, the controller 30 simultaneously executes the first printing operation in S5 and the second printing operation in S6 in FIG. 3. In this case, the controller 30 generates image data of a combined image of the reversed image B and the alignment mark D based on image data of the reversed image B and image data of the alignment mark D, and converts the image data of the combined image into print data. Then, based on the print data converted from the image data of the combined image of the reversed image B and the alignment mark D, the controller 30 alternately repeats a conveyance control of controlling the conveyance device 20 to convey the transfer sheet A and a pass control of controlling the head 12 to eject sublimation ink from the first nozzles 12*a* of the head 12 and to eject non-sublimation ink from the second nozzles 12*b* while controlling the movement device 40 to move the head 12 in the left-right direction. After the reversed image B is printed with sublimation ink and the alignment mark D is printed with non-sublimation ink on the front surface A1 of the transfer sheet A in this way, the controller 30 controls the conveyance device 20 to discharge the transfer sheet A to the discharge tray 11. On the front surface A1, the reversed image B is printed within the alignment mark D. The controller 30 may execute the first printing operation and the second printing operation sequentially, not simultaneously.

Figure 8B:
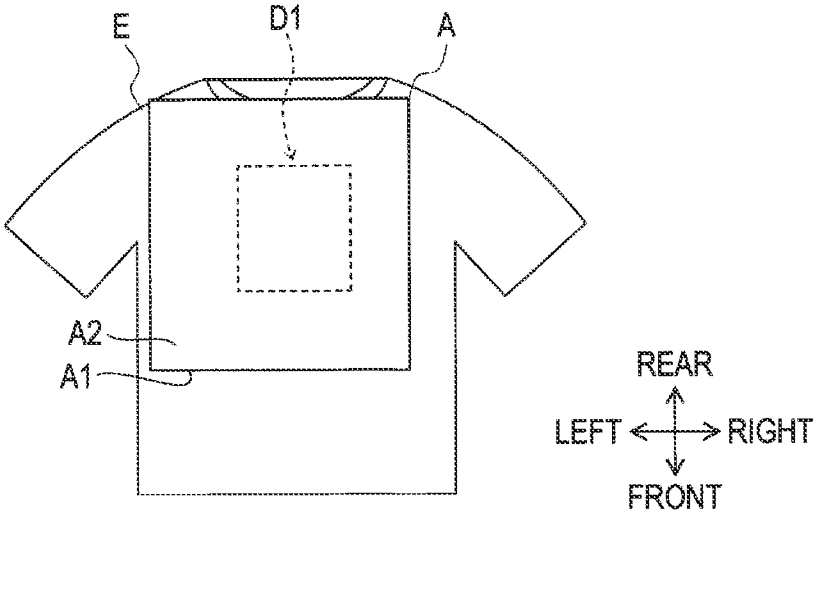
FIG. 8B is a view showing a transfer target medium on which the transfer sheet is overlaid in a state where the front surface of the transfer sheet faces the transfer target medium.

This non-sublimation ink has a property of more easily permeating from the front surface A1 toward the back surface A2 of the transfer sheet A than sublimation ink. For example, non-sublimation ink has a smaller surface tension than sublimation ink. Thus, non-sublimation ink has better wettability to the transfer target medium E than sublimation ink, and easily permeates from the front surface A1 to the back surface A2 of the transfer target medium E. Thus, as shown in FIG. 8B, a so-called strike-through DI occurs in which non-sublimation ink reaches or nearly reaches the back surface A2 of the transfer target medium E.

This strike-through DI allows the alignment mark D to be visible from the back surface A2 of the transfer sheet A. This enables the user to easily align the reversed image B printed on the front surface A1 of the transfer sheet A at a desired position on the transfer target medium E while viewing the strike-through DI of the alignment mark D visible from the back surface A2 of the transfer sheet A, in a state where the front surface A1 of the transfer sheet A faces the transfer target medium E. Further, the transfer sheet A need not be reversed between the front surface A1 and the back surface A2, which enables both the reversed image B and the alignment mark D to be printed on the transfer sheet A quickly.

Also in this case, the reversed image B is printed on the transfer sheet A with sublimation ink, whereas the alignment mark D is printed on the transfer sheet A with non-sublimation ink. Thus, the reversed image B and the transfer target medium E are easily aligned based on the alignment mark D, and the contamination by the alignment mark D at the time of transfer is reduced, whereby the deterioration of the image quality of the transfer image C due to the alignment mark D is suppressed.

For example, in a case where the alignment mark D overlaps a part or the entirety of the reversed image B, both non-sublimation ink in the second printing operation and sublimation ink in the first printing operation land on the same region of the transfer sheet A. The controller 30 may control the head 12 such that non-sublimation ink lands on the region of the transfer sheet A before sublimation ink lands on the region of the transfer sheet A. This enables non-sublimation ink to easily permeate into the transfer sheet A, so that the alignment mark D is easily visually recognizable from the back surface A2 of the transfer sheet A and sublimation ink is easily transferred to the transfer target medium E.

Non-sublimation ink may be water-based dye ink. This non-sublimation ink also permeates from the front surface A1 to the back surface A2 of the transfer sheet A more easily than sublimation ink. This enables the alignment mark D to be visually recognizable from the back surface A2 of the transfer sheet A, and thus the reversed image B is easily aligned at a desired position on the transfer target medium E based on the alignment mark D which is visually recognizable from the back surface A2 of the transfer sheet A.

In the second printing operation, the controller 30 may control the head 12 to print the alignment mark D by ejecting, from the second nozzles 12*b*, ink droplets having a relatively large volume among ink droplets having a plurality of sizes with different volumes which are ejectable from the second nozzles 12*b*. For example, the printing apparatus 1 is configured to eject ink droplets of a medium size which is a particular volume, ink droplets of a small size which is smaller than the particular volume, and ink droplets of a large size which is larger than the particular volume from the nozzles of the first nozzles 12*a* and the second nozzles 12*b*.

In this case, in the second printing operation, the controller 30 controls the head 12 to eject non-sublimation ink of ink droplets having the largest size among the ejectable sizes from the second nozzles 12*b* onto the front surface A1 of the transfer sheet A. Thereby, the density of the alignment mark D printed on the transfer sheet A becomes higher than the density of the reversed image B printed on the transfer sheet A. Thus, non-sublimation ink is more likely to permeate into the transfer sheet A than sublimation ink. The strike-through DI of this non-sublimation ink enables the alignment mark D to be visually recognizable from the back surface A2 of the transfer sheet A. Thus, the reversed image B is easily aligned at a desired position on the transfer target medium E based on the strike-through DI of the alignment mark D which is visually recognizable from the back surface A2 of the transfer sheet A.

In the second printing operation, the controller 30 may control the head 12 to print the alignment mark D by ejecting ink droplets from the second nozzles 12*b* such that a duty of ink in a print region of the alignment mark D is greater than or equal to 100%. For example, the duty is a ratio of the total area of dots of non-sublimation ink constituting the alignment mark D to the area of the print region of the alignment mark D on the transfer sheet A. When the total area of dots is equal to the area of the print region, the entire print region is covered with dots, and the duty of the ink is 100%, which is a so-called solid printing. Thus, when the duty is greater than or equal to 100%, non-sublimation ink covers, by dots, the print region of the alignment mark D on the front surface A1 of the transfer sheet A, and easily permeates into the back surface A2 of the transfer sheet A. The strike-through DI of non-sublimation ink allows the alignment mark D to be visually recognizable from the back surface A2 of the transfer sheet A, and thus the reversed image B is easily located at a desired position on the transfer target medium E based on the strike-through DI of the alignment mark D which is visually recognizable from the back surface A2 of the transfer sheet A.

In the printing apparatus 1 according to Modification 3, before the second printing operation, the controller 30 executes the acquisition operation of acquiring the position of the alignment mark D based on image data obtained by reading, with the scanner unit 14, the reversed image B which is the image for transfer printed by the first printing operation.

Figure 9:
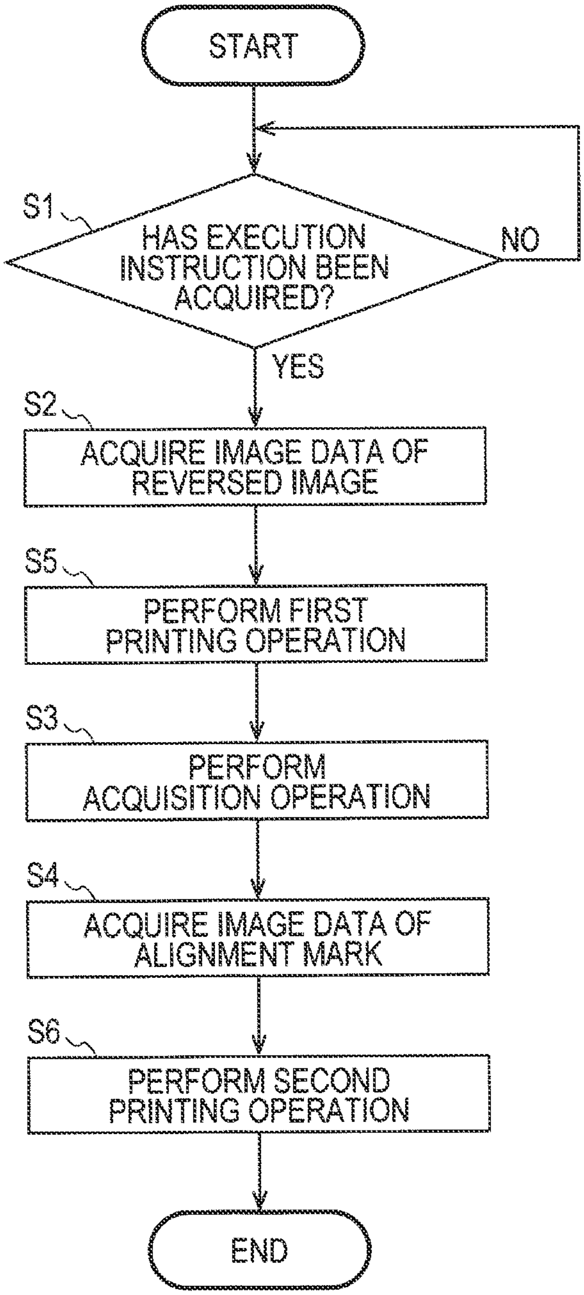
FIG. 9 is a flowchart showing an example of a control method of controlling a printing apparatus.

FIG. 9 is a flowchart showing an example of a printing operation of the printing apparatus 1 according to Modification 3. In the flowchart of FIG. 9, the first printing operation of S5 in the flowchart of FIG. 3 is executed between S2 and S3. Thus, in response to acquiring an execution instruction of the printing operation (S1: YES), the controller 30 acquires the image data of the reversed image B (S2), and executes the first printing operation of printing the reversed image B on the transfer sheet A based on print data obtained by converting the image data (S5).

Thereby, the transfer sheet A on which the reversed image B is printed is discharged to the discharge tray 11.

In the acquisition operation in S3, when the user sets the transfer sheet A in the ADF 16, the transfer sheet A is conveyed onto the document table of the scanner unit 14, and the scanner unit 14 reads the reversed image B printed on the transfer sheet A and outputs this image data to the controller 30. The user may place the transfer sheet A on the document table of the scanner unit 14. In this case as well, the scanner unit 14 reads the reversed image B of the transfer sheet A on the document table, and outputs this image data to the controller 30.

The controller 30 performs image processing on the reversed image B to acquire, for example, four ends Br, Bl, Bf, and Bb of the reversed image B. In a case where the alignment mark D is printed on the front surface A1 of the transfer sheet A together with the reversed image B, the positions of the four ends are acquired as the position of the alignment mark D printed on the front surface A1. In a case where the alignment mark D is printed on the back surface A2 different from the front surface A1, which is the print surface of the reversed image B, the controller 30 acquires positions Br', Bl', Bf', and Bb' (or Br ", Bl", Bf ", and Bb") as the position of the alignment mark D printed on the back surface A2. The positions Br', Bl', Bf', and Bb' (or Br ", Bl", Bf ", and Bb") are positions which are line-symmetrical to positions of the four ends with respect to the center line A0 or A4 as the symmetry axis, and are applied to the back surface A2.

Then, the controller 30 acquires image data of the alignment mark D that is a rectangular surrounding line arranged at the position of the alignment mark D (S4). Then, the controller 30 executes the second printing operation of printing the alignment mark D on the front surface A1 or the back surface A2 of the transfer sheet A based on print data obtained by converting the image data (S6). This produces the transfer sheet A having the reversed image B printed with sublimation ink and the alignment mark D printed with non-sublimation ink. Thus, the reversed image B and the transfer target medium E are easily aligned based on the alignment mark D, and the deterioration of the image quality of the transfer image C caused by the alignment mark D is suppressed by reducing the contamination due to the alignment mark D at the time of transfer.

Figure 10:
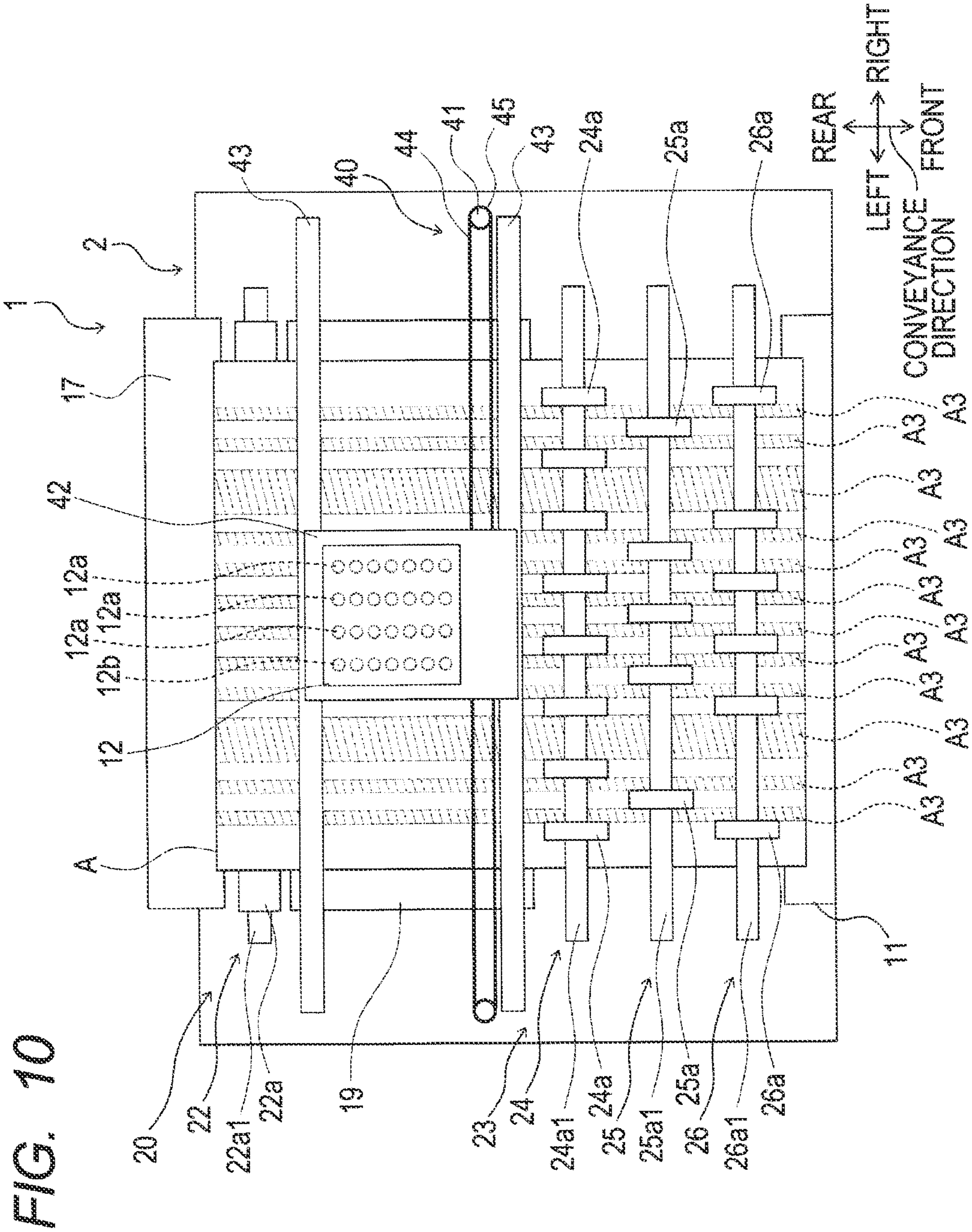
FIG. 10 is a schematic view of a printing apparatus, as viewed from above.

According to Modification 4, as shown in FIG. 10, the printing apparatus 1 further includes a conveyance device 20 that has a plurality of rollers arranged at intervals along a crossing direction on the downstream side of the head 12 in a conveyance direction of the transfer sheet A, the crossing direction being a direction crossing the conveyance direction of the transfer sheet A. In the second printing operation, the controller 30 controls the head 12 to print the alignment mark D in non-contact areas A3 of the transfer sheet A, which are not in contact with the rollers.

Specifically, the printing apparatus 1 includes a platen 19. The platen 19 is located below the ejection surface of the head 12 with a particular distance therebetween. A flat upper surface of the platen 19 faces the ejection surface of the head 12 and supports the transfer sheet A from below.

The printing apparatus 1 further includes the movement device 40 that reciprocates the head 12 in the left-right direction. The movement device 40 includes a carriage 42, two guide rails 43, an endless belt 44, and the movement motor 41. The carriage 42 is a box-shaped housing and has the head 12 mounted thereon. The two guide rails 43 are arranged on the platen 19 so as to extend in the left-right direction above the platen 19 and to be spaced apart from each other in the front-rear direction, with all the nozzles 12*a* and 12*b* that open in the ejection surface of the head 12 arranged therebetween. The carriage 42 is supported by the two guide rails 43 so as to reciprocate in the left-right direction. The endless belt 44 is wound around two pulleys 45 provided in the vicinity of both left and right ends of one guide rail 43, and is connected to the movement motor 41 via the pulleys 45 and is also connected to the carriage 42. With this configuration, in the movement device 40, when the movement motor 41 is driven to rotate, the endless belt 44 moves, and the carriage 42 on which the head 12 is mounted moves in the left-right direction along the guide rails 43.

The printing apparatus 1 further includes the conveyance device 20 that conveys a sheet such as the transfer sheet A in the front-rear direction. The conveyance device 20 includes an upstream roller unit 22, a downstream roller unit 23, and the conveyance motor 21 (FIG. 2). The platen 19, the head 12, and the carriage 42 are arranged between the upstream roller unit 22 and the downstream roller unit 23 in the front-rear direction.

Figure 11:
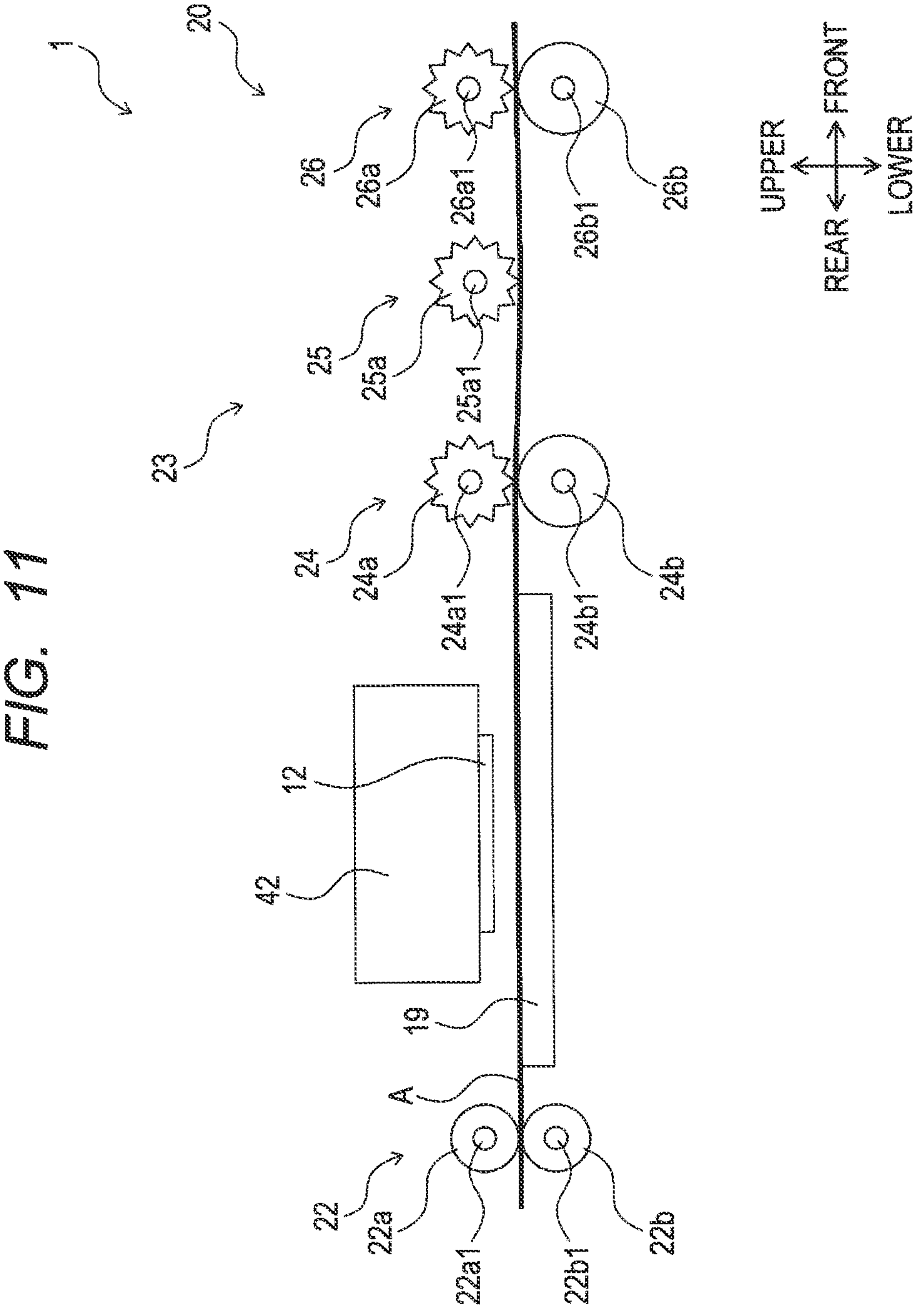
FIG. 11 is a schematic view of a conveyance device, a platen, and a head as viewed from left.

As shown in FIGS. 10 and 11, the upstream roller unit 22 includes an upstream roller 22*a* and an upstream roller 22*b* arranged below the upstream roller 22*a* in the upper-lower direction. The upstream roller 22*a* and the upstream roller 22*b* are rotatably supported by center shafts 22*al* and 22*b*1 extending in the left-right direction, respectively. One of the center shafts 22*al* and 22*b*1 is connected to the conveyance motor 21. The upstream roller 22*a* and the upstream roller 22*b* are driven by the conveyance motor 21 to rotate while sandwiching the transfer sheet A therebetween so as to convey the transfer sheet A on the platen 19 in the front-rear direction.

The downstream roller unit 23 includes a first roller set 24, a second roller set 25, and a third roller set 26. The first roller set 24, the second roller set 25, and the third roller set 26 are arranged in this order from the rear side in the front-rear direction. The first roller set 24 includes a plurality of (for example, eight) pairs of a first roller 24*a* and a first roller 24*b*. The first roller 24*b* is disposed below the first roller 24*a* in the upper-lower direction. The first rollers 24*a* and the first rollers 24*b* are rotatably supported by center shafts 24*al* and 24*b*1 extending in the left-right direction, respectively. One of the center shafts 24*al* and 24*b*1 is connected to the conveyance motor 21. The first rollers 24*a* and the first rollers 24*b* are driven by the conveyance motor 21 to rotate while sandwiching the transfer sheet A therebetween so as to convey the transfer sheet A on the platen 19 in the front-rear direction.

The second roller set 25 includes a plurality of (for example, five) second rollers 25*a*. The second rollers 25*a* are rotatably supported by a center shaft 25*al* extending in the left-right direction. The center shaft 25*al* is connected to the conveyance motor 21, and the second rollers 25*a* are rotated by driving of the conveyance motor 21.

The third roller set 26 includes a plurality of (for example, six) pairs of a third roller 26*a* and a third roller 26*b*. The third roller 26*b* is disposed below the third roller 26*a* in the upper-lower direction. The third rollers 26*a* and the third rollers 26*b* are rotatably supported by center shafts 26*al* and 26*b*1 extending in the left-right direction, respectively. One of the center shafts 26*al* and 26*b*1 is connected to the conveyance motor 21. The third rollers 26*a* and the third rollers 26*b* are rotated by the driving of the conveyance motor 21 to convey the transfer sheet A sandwiched therebetween.

In the conveyance device 20, the upstream rollers 22*a* and 22*b* of the upstream roller unit 22 and the rollers 24*b* and 26*b* of the downstream roller unit 23 are rubber rollers having no protrusions formed on the outer circumferential surfaces thereof, whereas the rollers 24*a*, 25*a*, and 26*a* of the downstream roller unit 23 are spur rollers having a plurality of protrusions formed on the outer circumferential surfaces thereof. Since the rollers 24*a*, 25*a*, and 26*a* are spur rollers, the ink landed on the transfer sheet A is less likely to adhere to the rollers 24*a*, 25*a*, and 26*a*. However, the rollers 24*a*, 25*a*, and 26*a* are not limited to spur rollers, and may be rollers having no protrusions on the outer circumferential surfaces thereof.

In the downstream roller unit 23 of the conveyance device 20, the eight first rollers 24*a* of the first roller set 24 are arranged at equal intervals in the left-right direction, and the eight first rollers 24*b* are arranged at equal intervals in the left-right direction. The six second rollers 25*a* of the second roller set 25 are arranged at intervals in the left-right direction, and each of the six second rollers 25*a* is arranged between two first rollers 24*a* adjacent to each other in the left-right direction when viewed from the front. The six third rollers 26*a* of the third roller set 26 are arranged at intervals in the left-right direction, and are arranged so as to overlap the first rollers 24*a* as viewed from the front. The six third rollers 26*b* of the third roller set 26 are arranged at intervals in the left-right direction, and are arranged so as to overlap the first rollers 24*b* when viewed from the front.

As described above, in the downstream roller unit 23 arranged downstream of the head 12 in the direction in which the transfer sheet A is conveyed, areas between the first rollers 24*a*, 24*b* (the third rollers 26*a*, 26*b*) and the second rollers 25*a* in the left-right direction are non-contact areas A3 of the transfer sheet A where these rollers do not contact. When viewed from the front, the non-contact areas A3 do not overlap any of the first rollers 24*a*, 24*b*, the third rollers 26*a*, 26*b*, and the second rollers 25*a*.

In S4 of FIGS. 3 and 9, the controller 30 acquires the positions of the non-contact areas A3 based on the positions of the rollers of the downstream roller unit 23 in the left-right direction. The positions of the rollers of the downstream roller unit 23 or the positions of the non-contact areas A3 are stored in the memory 31. The controller 30 acquires image data of the alignment mark D based on the positions of the non-contact areas A3 and the image data of the reversed image B such that the alignment mark D is printed in the non-contact areas A3.

Figure 12:
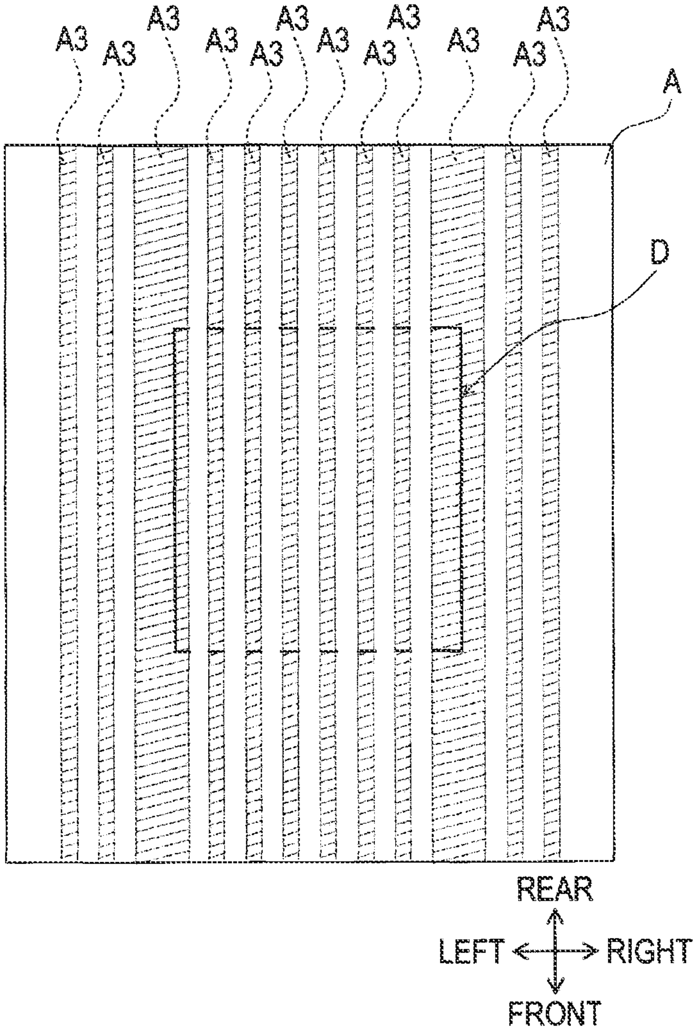
FIG. 12 is a view showing a transfer sheet on which an alignment mark is printed in non-contact areas.

Then, in S6 of FIGS. 3 and 9, the controller 30 executes the second printing operation based on print data obtained by converting the image data of the alignment mark D. Here, the controller 30 controls the ejection timing of non-sublimation ink from the second nozzles 12*b* so that the alignment mark D is printed in the non-contact areas A3 of the transfer sheet A as shown in FIG. 12. When the controller 30 drives the conveyance motor 21 (FIG. 2), the rollers of the upstream roller unit 22 and the downstream roller unit 23 rotate while sandwiching the transfer sheet A, whereby the transfer sheet A is conveyed to the downstream roller unit 23 arranged at the front side of the head 12.

Non-sublimation ink landed on the non-contact areas A3 of the transfer sheet A is conveyed forward through between the first rollers 24*a*, 24*b*, the third rollers 26*a*, 26*b* and the second rollers 25*a* in the downstream roller unit 23. Thus, the non-sublimation ink does not contact these rollers, which suppresses deterioration in image quality of the alignment mark D and contamination of the rollers due to the contact. The reversed image B and the transfer target medium E are easily aligned based on the alignment mark D.

What is claimed is:

1. A printing apparatus comprising:

a head including a first nozzle and a second nozzle, the first nozzle being configured to eject sublimation ink, the second nozzle being configured to eject non-sublimation ink; and a controller configured to perform:

a first printing operation of printing an image on a transfer sheet based on image data by ejecting the sublimation ink from the first nozzle; and a second printing operation of printing an alignment mark on the transfer sheet by ejecting the non-sublimation ink from the second nozzle.

2. The printing apparatus according to claim 1, wherein the first nozzle includes a cyan nozzle configured to eject the sublimation ink of cyan color, a magenta nozzle configured to eject the sublimation ink of magenta color, and a yellow nozzle configured to eject the sublimation ink of yellow color; and wherein the second nozzle includes a black nozzle configured to eject the non-sublimation ink of black color.

3. The printing apparatus according to claim 1, wherein the controller is configured to perform, before printing the alignment mark, an acquisition operation of acquiring a position of the alignment mark based on the image data.

4. The printing apparatus according to claim 1, wherein the alignment mark is a surrounding line surrounding the image formed by ejecting the sublimation ink from the first nozzle.

5. The printing apparatus according to claim 1, wherein the alignment mark is a line drawing representing an outline of the image formed by ejecting the sublimation ink from the first nozzle.

6. The printing apparatus according to claim 5, wherein an amount of the non-sublimation ink used to print the line drawing is smaller than an amount of the sublimation ink used to print the outline of the image.

7. The printing apparatus according to claim 1, wherein the image is printed on a first surface of the transfer sheet by ejecting the sublimation ink from the first nozzle; and wherein the alignment mark is printed on a second surface of the transfer sheet, the second surface being a different surface from the first surface.

8. The printing apparatus according to claim 7, wherein the alignment mark has a rectangular shape formed by a first pair of line segments each extending in a first direction and a second pair of line segments each extending in a second direction perpendicular to the first direction, the first pair of line segments passing through both ends of the image in the second direction when viewed in a thickness direction of the transfer sheet, the second pair of line segments passing through both ends of the image in the first direction when viewed in the thickness direction of the transfer sheet.

9. The printing apparatus according to claim 7, wherein the alignment mark is a line drawing representing an outline of the image formed by ejecting the sublimation ink from the first nozzle, the line drawing overlapping the outline of the image when viewed in a thickness direction of the transfer sheet.

10. The printing apparatus according to claim 7, wherein the controller is configured to perform:

a first acquisition operation of acquiring, based on pixel values of image data of the image, four pixels at four ends of the image in a first direction and a second direction perpendicular to each other, from among pixels of the image formed by ejecting the sublimation ink from the first nozzle;

a second acquisition operation of acquiring symmetrical positions that are line-symmetric to positions of the four pixels on the first surface of the transfer sheet with respect to a center line, the center line passing through a center of the transfer sheet in the first direction and the second direction and extending in the first direction; and a third acquisition operation of acquiring, as a position of the alignment mark, positions obtained by applying the symmetrical positions to the second surface of the transfer sheet.

11. The printing apparatus according to claim 1, wherein the image is printed on a first surface of the transfer sheet by ejecting the sublimation ink from the first nozzle; and wherein the alignment mark is printed on the first surface of the transfer sheet by ejecting the non-sublimation ink from the second nozzle.

12. The printing apparatus according to claim 11, wherein the non-sublimation ink has a property of more easily permeating from the first surface toward a second surface of the transfer sheet than the sublimation ink, the second surface being a different surface from the first surface.

13. The printing apparatus according to claim 12, wherein the non-sublimation ink has a smaller surface tension than the sublimation ink.

14. The printing apparatus according to claim 12, wherein the non-sublimation ink is water-based dye ink.

15. The printing apparatus according to claim 11, wherein the controller is configured to perform:

the second printing operation of printing the alignment mark by ejecting, from the second nozzle, ink droplets having a relatively large volume among ink droplets having a plurality of sizes with different volumes, the ink droplets having the plurality of sizes being ejectable from the second nozzle; or the second printing operation of printing the alignment mark by ejecting ink droplets from the second nozzle such that a duty of ink in a print region of the alignment mark is greater than or equal to 100%.

16. The printing apparatus according to claim 11, wherein the controller is configured to simultaneously perform the first printing operation of printing the image by ejecting the sublimation ink from the first nozzle and the second printing operation of printing the alignment mark by ejecting the non-sublimation ink from the second nozzle.

17. The printing apparatus according to claim 1, further comprising a conveyor including a plurality of rollers arranged downstream of the head in a conveyance direction of the transfer sheet, the plurality of rollers being arranged at intervals along a direction crossing the conveyance direction, wherein the controller is configured to control the head to print the alignment mark in a non-contact area of the transfer sheet, the non-contact area being an area that does not contact the plurality of rollers.

18. A control method of controlling a printing apparatus comprising a head including a first nozzle and a second nozzle, the first nozzle being configured to eject sublimation ink, the second nozzle being configured to eject non-sublimation ink, the control method comprising:

a first printing operation of printing an image on a transfer sheet based on image data by ejecting the sublimation ink from the first nozzle; and a second printing operation of printing an alignment mark on the transfer sheet by ejecting the non-sublimation ink from the second nozzle.

19. A non-transitory computer-readable storage medium storing a set of program instructions for a printing apparatus comprising a controller and a head including a first nozzle and a second nozzle, the first nozzle being configured to eject sublimation ink, the second nozzle being configured to eject non-sublimation ink, the set of program instructions, when executed by the controller, causing the printing apparatus to perform:

a first printing operation of printing an image on a transfer sheet based on image data by ejecting the sublimation ink from the first nozzle; and a second printing operation of printing an alignment mark on the transfer sheet by ejecting the non-sublimation ink from the second nozzle.

* * * * *